US006639156B2

(12) United States Patent
Luke et al.

(10) Patent No.: US 6,639,156 B2
(45) Date of Patent: Oct. 28, 2003

(54) METHOD AND DEVICE FOR MONITORING INVENTORY (76) Inventors: Tom J. Luke, 10708 N. Campbell, Kansas City, MO (US) 64155; Greg Arnold, 417 Washington Pl., Wylie, TX (US) 75098; Jim S. Havers, 1207 Glendale Rd., Marrietta, OH (US) 45750; Gordy F. Gould, 195 Cortland Hill Rd., Waterford, VT (US) 05819

( * ) Notice: Subject to any disclaimer, the term of this patent is extended or adjusted under 35 U.S.C. 154(b) by 183 days.

(21) Appl. No.: 09/751,195

(22) Filed: Dec. 28, 2000

(65) Prior Publication Data

US 2001/0034671 A1 Oct. 25, 2001

Related U.S. Application Data (60) Provisional application No. 60/173,853, filed on Dec. 30, 1999.

(51) Int. Cl.[7] ............................ G01G 23/18; G06F 17/60
(52) U.S. Cl. .............................. 177/25.13; 177/25.19; 177/199; 705/28; 340/666; 235/385
(58) Field of Search .......................... 177/25.11–25.19, 177/199, 200; 340/666; 705/28; 235/385

(56) References Cited

U.S. PATENT DOCUMENTS

| | | | | |
|---|---|---|---|---|
| 4,645,019 A | * | 2/1987 | Minamida et al. | 177/25.17 |
| 4,655,304 A | * | 4/1987 | Tajima | 177/25.17 |
| 4,691,290 A | * | 9/1987 | Griffen | 177/25.13 |
| 4,804,052 A | * | 2/1989 | Griffen | 177/25.14 |
| 4,815,547 A | * | 3/1989 | Dillon et al. | 177/25.14 |
| 4,901,237 A | * | 2/1990 | Hikita et al. | 177/25.15 |
| 4,992,775 A | * | 2/1991 | Castle et al. | 340/666 |
| 5,174,400 A | * | 12/1992 | Hasegawa et al. | 177/200 |

* cited by examiner

Primary Examiner—Randy Gibson
(74) Attorney, Agent, or Firm—Shook, Hardy & Bacon L.L.P.

(57) ABSTRACT

A method and device for electronically controlling inventory utilizing multiple modularized integrated load cell weight indicating devices. An inventory monitoring system is provided having a central system controller and one or more modules. Each module includes a master integrated load cell weight indicating device having a microprocessor based controller, a communications controller, a A/D converter, and a weight indicating device. Connected to each master integrated load cell is one or more slave integrated load cell weight indicating devices not utilizing any separate communications controller or microprocessor-based controller. In practice, communications are implemented utilizing a data structure indicating a module address, a individual weight indicating device subaddress and a command and passed between the central system controller and the module. Both the integrated master and slave load cell include only a top platter and a load cell, with no base structure supporting the load cell. The present invention allows for multiple part inventory monitoring by reducing the costs of implementing and maintaining the monitoring system.

2 Claims, 7 Drawing Sheets

METHOD AND DEVICE FOR MONITORING INVENTORY

CROSS-REFERENCE TO RELATED APPLICATIONS

This application claims the benefit of U.S. provisional application Ser. No. 60/173,853 filed Dec. 30, 1999.

TECHNICAL FIELD

In general, the present invention relates to inventory control systems, and in particular to a method and device for electronically controlling inventory utilizing multiple modularized integrated load cell weight indicating devices.

BACKGROUND OF THE INVENTION

Some conventional inventory monitoring systems utilize scales and bins to monitor the amount of inventory left within a customer site and to order appropriate replacements. Under such a system, a customer's site is installed with multiple scales, each scale having a bin located on top of the scale for receiving the inventory to be monitored. Inventory estimates are then calculated by determining a number of parts per weight ratio and multiplying it by the weight of the inventory in the bin. For example, if the inventory in concern is a screw having a parts per number factor of 1 screw per 2 ounces, a weight reading by the scale of 100 ounces would indicate approximately 50 screws remained in the bin. Accordingly, a supplier can monitor the weight of several bins and order replacements inventory as supply, and accordingly weight, decreases.

As applied to a larger customer, the conventional weight monitoring system can require an investment, either by the customer or the supplier, in a large number of scales to monitor a variety of parts. Because each individual part would likely have a different parts per weight ratio, a customer site having 300 different parts to be monitored would require an investment of 300 separate scales and bins to be connected to the monitoring system.

Typically, the conventional scale for monitoring and reporting weight reading includes a multiple part platform assembly having a separate top platter, constructed of metal or other suitable material, a load cell for detecting a weight, and a base for supporting the load cell detecting the weight. Additionally, each scale typically has its own microprocessor-based electronics to communicate weight data to the monitoring system. One such method of communicating electronics include assigning an individual address to each scale/bin combination to be identified by the monitoring system. As would be understood, a multiple part assembly and individual electronics further burdens the system supplier (either the customer or inventory monitor) in a higher initial investment in scale equipment investments as well as increased maintenance costs. Thus, the number of scales required to monitor inventory coupled with the costs of the individual scale components and features, creates a high cost for inventory monitoring.

Accordingly, there is a need for a more cost effective inventory monitoring system which allows for individual monitoring of inventory, while reducing the implementation costs of the weight measuring and communication devices.

SUMMARY OF THE INVENTION

The present invention satisfies the above-described need by providing a method and device for electronically controlling inventory utilizing one or more weight indicating modules having multiple weight indicating devices connected to each module.

Generally described, the present invention provides an electronic weight indicating module. The module of the present invention includes two or more weight indicating devices and a microprocessor. The microprocessor is in communication with the weight indicating devices, receives data indicative of a weight from the weight indicating devices and communicates the data to an external source.

In another aspect of the present invention, an inventory control system is provided. The inventory control system includes a central system controller and a remote electronic weight indicating module. The remote electronic weight indicating module has two or more weight indicating devices, and the central system receives data indicative of weight from the weight indicating devices via the module.

In a further aspect of the present invention, a method of communicating in an inventory control system is provided. The inventory control system includes a central system controller and an electronic weight indicating module having two or more weight indicating devices is provided. The method of communicating includes issuing data indicative of a designation of a module, issuing data indicative of a designation of a weight indicating device within the module, and issuing data indicative of a command associated with the weight indicating device.

In yet another aspect of the present invention, an integrated load cell weight indicating device is provided. The integrated load cell weight indicating device utilizes only a top platter, and an integrated load cell. The top platter is coupled to the load cell and the load cell includes at least one leg for supporting the device without an additional base structure.

Finally, in another aspect of the present invention an integrated load cell master weight indicating device is provided. The integrated load cell master weight indicating device utilizes only a top platter, a load cell, and a communications port. The top platter is coupled to the load cell, and the communications port is operatively connected to an output of the load cell. Additionally, the load cell includes at least one leg for supporting the device without an additional base structure, and the communications port transmits data indicative of a weight to an external source.

The method and devices of the present invention allow multiple weight indicating devices to be coupled to one or more weight indicating modules without requiring each individual weight indicating device to utilize a separate communications controller or separate microprocessor based logic control. Preferably implemented in a master/slave configuration, the present invention reduces the cost of implementation and maintenance in inventory monitoring systems.

BRIEF DESCRIPTION OF THE DRAWING

The present invention is described in detail below with reference to the attached figures, wherein.

DETAILED DESCRIPTION OF THE INVENTION

Figure 1:
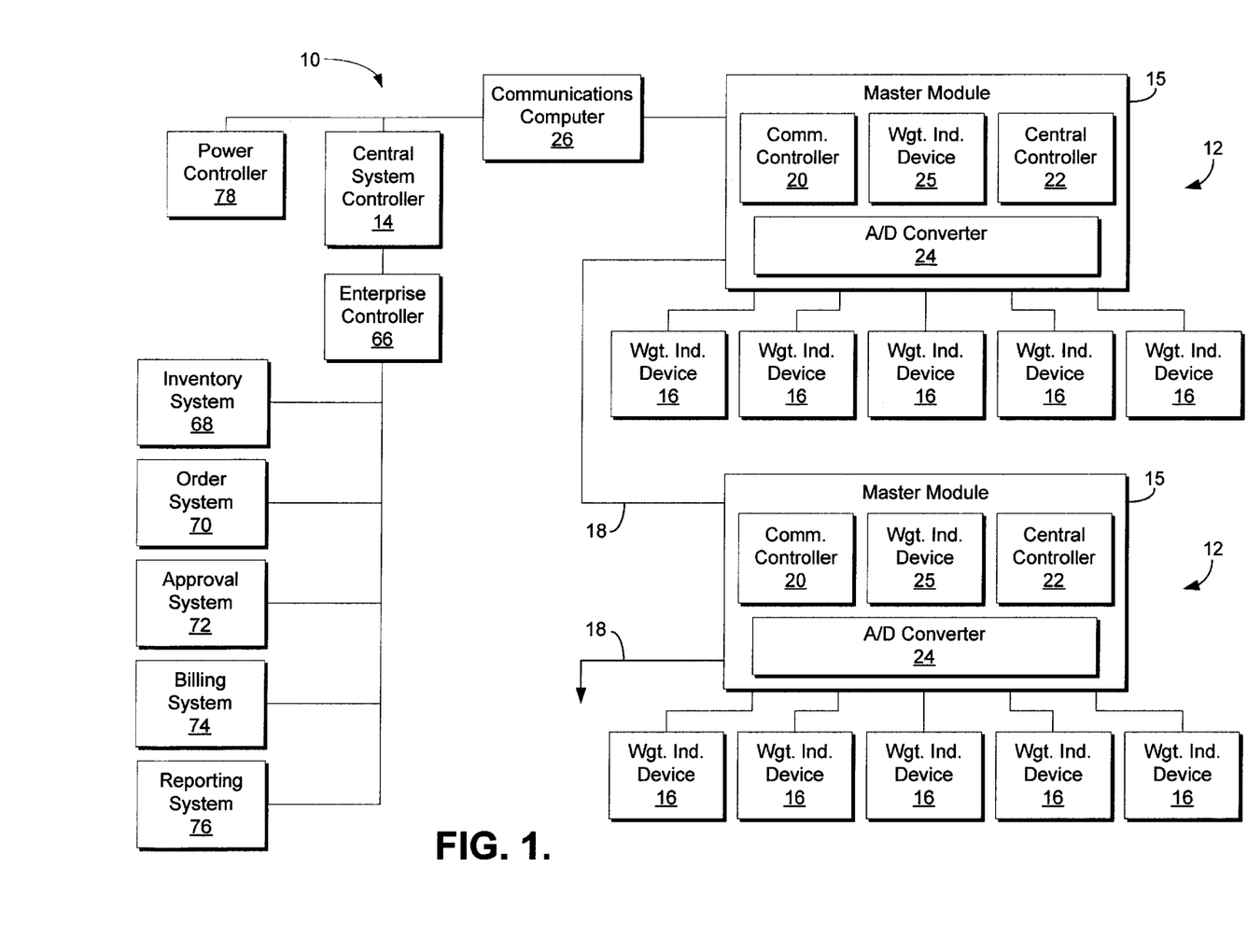
FIG. 1 is a block diagram of an electronic inventory monitoring system utilizing weight indicating modules of the present invention.

The present invention provides a method and device for electronically monitoring inventory utilizing weight indicating modules. FIG. 1 is block illustrating an electronic monitoring system, described generally by the reference numeral 10. Preferably, system 10 includes at least one weight indicating module, referenced generally by the numeral 12, in communication with a central system controller 14. To calculate the number of parts in inventory, module 12 communicates a weight of a particular number of parts to the system controller 14 which calculates the number of parts in the bin by multiplying the weight of the parts by a parts per weight ratio.

As illustrated in FIG. 1, the system 10 includes multiple modules 12 in communication with one another via a communications bus line 18, and further in communications with the system controller 14. Preferably, the modules 12 are connected in a daisy chain configuration utilizing a RS485 communication interface. As would be readily understood by someone skilled in the relevant art, different communication configurations or communication interfaces are within the scope of the present invention. Moreover, a separate communications computer 26 may be incorporated into the system to provide some on-location monitoring or to be an interface between the modules 12 and the system controller 14.

Preferably, the modules 12 include a master weight indicating device 15 having a communications controller 20, a central controller 22, an analog to digital (A/D) converter 24. The central controller 22 includes microprocessor based electronics for receiving digital weight indication signals from the weight indicating devices and converting the signals into recognizable weight values. Communication controller 20 preferably provides a two-way communications link between the weight indicating devices and the central system controller 14. A/D converter 24 preferably convert analysis signals from the weight indicating devices to digital signals for processing. Preferably, master weight indicating device 15 also includes a weight indicating device 25.

Connected to each master weight indicating device 15 are one or more slave weight indicating devices 16 which do not utilize separate central controllers 22 or communications controllers 20. Accordingly, the module 12 includes multiple weight indicating devices without requiring each weight indicating device to maintain individual communications and processing functions.

Figure 4:
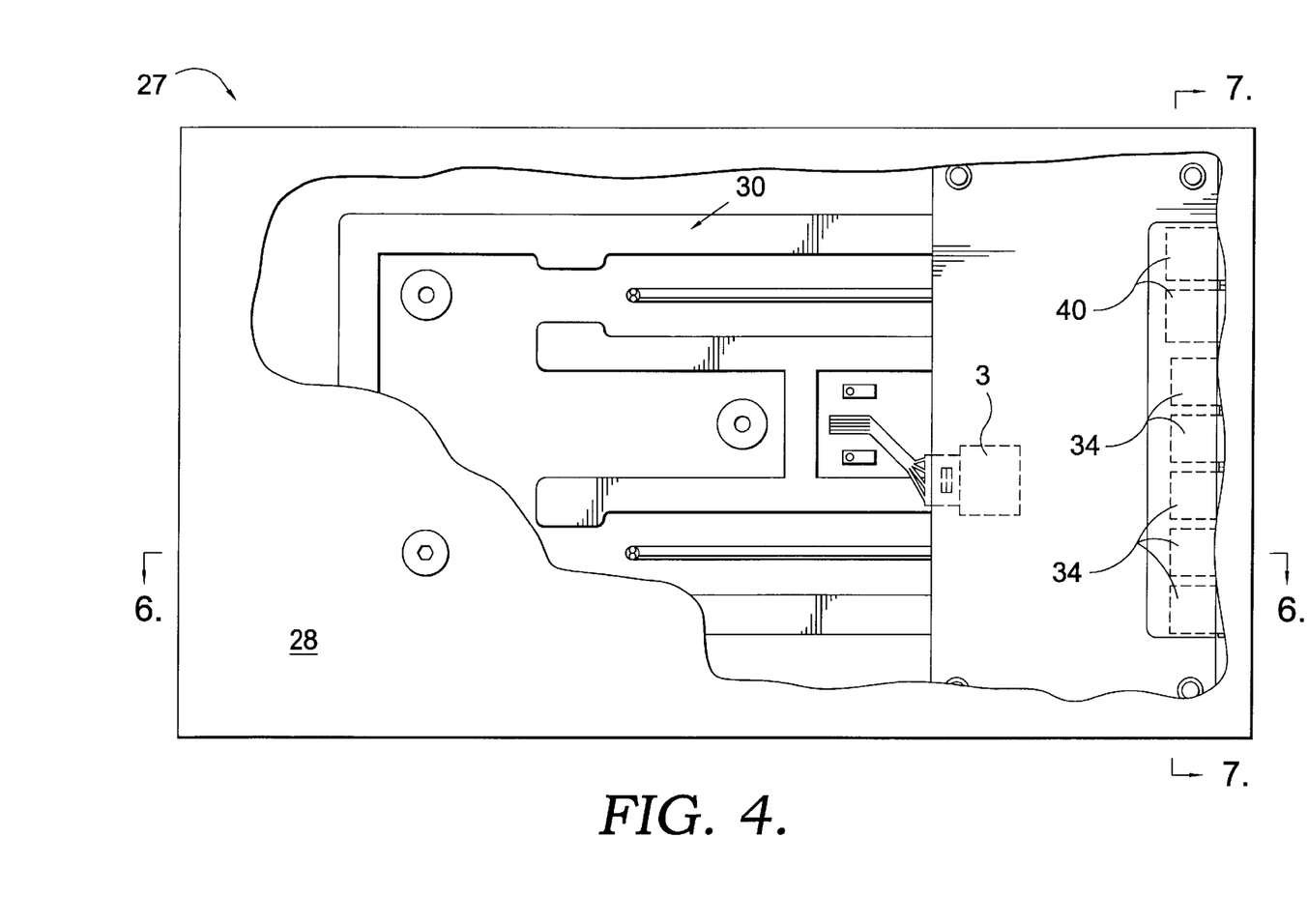
FIG. 4 is a top plan of the master integrated load cell of the present invention with cutouts demonstrating the preferred construction.
Figure 5:
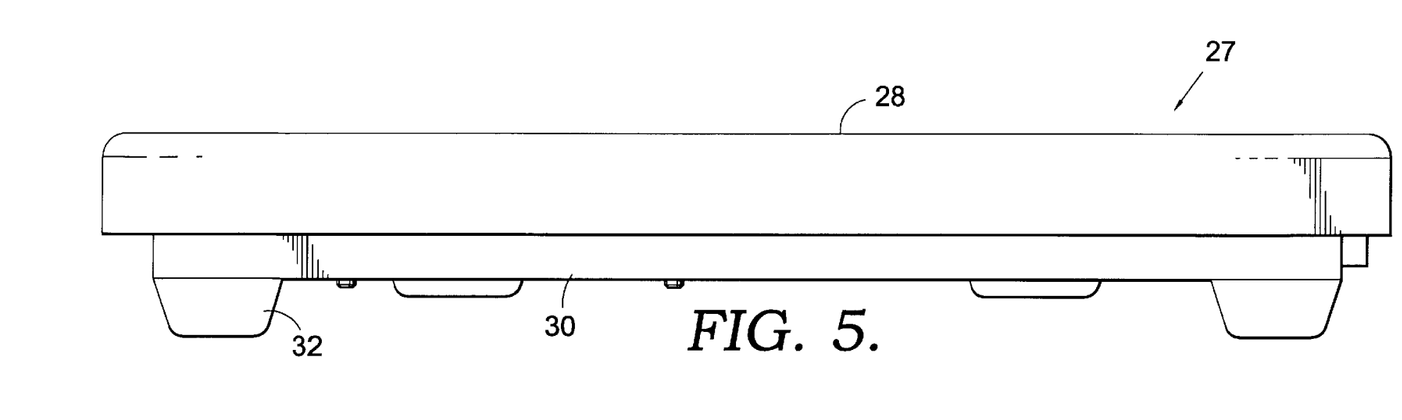
FIG. 5 is an elevational view of the master integrated load cell of the present invention.
Figure 6:
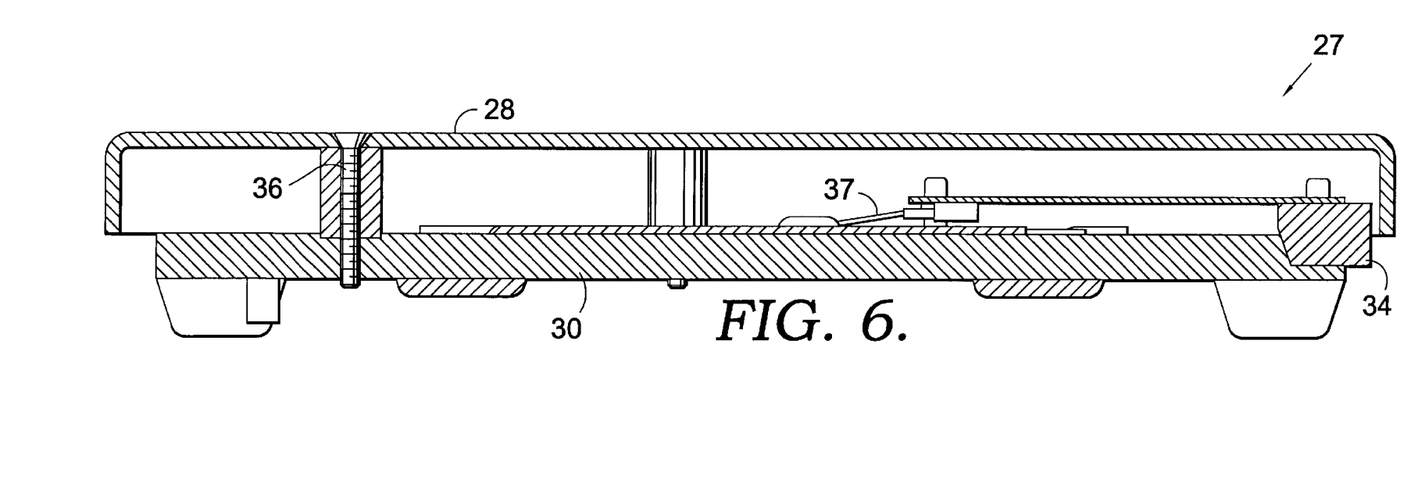
FIG. 6 is a sectional view of the master integrated load cell of the present invention.
Figure 7:
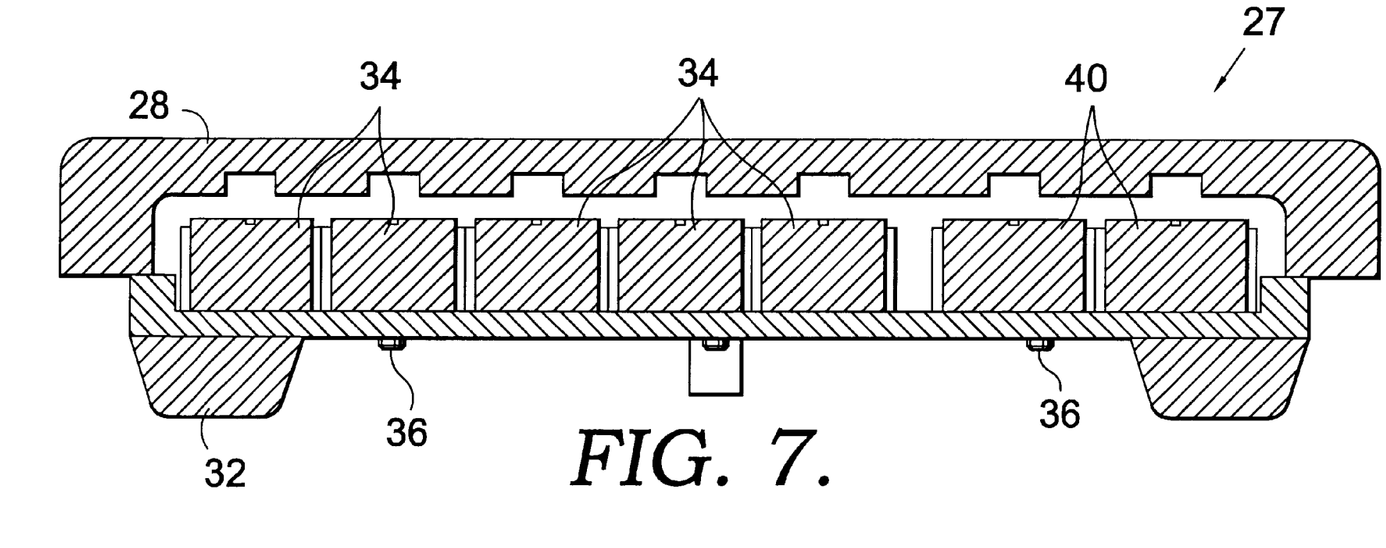
FIG. 7 is a sectional view of the master integrated load cell of the present invention.

FIGS. 4, 5, 6, and 7 illustrate the preferred master integrated load cell 27 weight indicating device of the present invention. Master integrated load cell 27 includes a top platter 28, which is preferably constructed of a metal or other suitable material such as composites. Top platter 28 covers the top of the master integrated load cell (as shown in FIG. 4) and covers portions of the four side walls (as shown in FIGS. 5, 6, and 7). Master integrated load cell 27 also includes a load cell 30 for detecting weight and is supported by four legs 32, preferably constructed of a plastic material. Thus, no additional base support is required for the load cell 30, as conventionally done.

FIG. 6 is sectional view of the master integrated load cell 27 of the present invention. As illustrated in FIG. 6, as a bin containing the parts to be weighed (or any other object to be weighed) is placed on the top platter 28, the platter experiences a downward force. The downward force is then translated to multiple spacers 36, which are in contact with the load cell 30. Load cell 30 receives the downward force, and accordingly produces a corresponding voltage indicative of the downward force. The corresponding voltage is converted to a digital signal by the A/D converter and transferred to the central controller. The central controller can then convert the digital signal into weight data for the monitoring system or alternatively transfer the digital signal to the central system controller via the communications controller.

Figure 2:
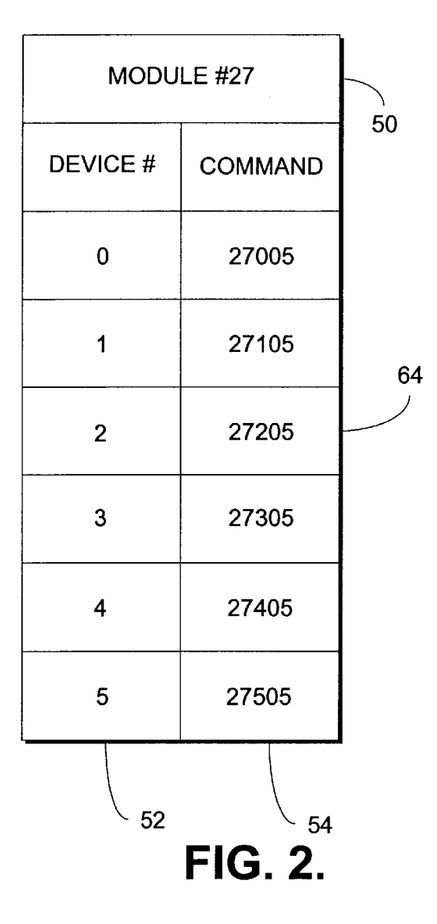
FIG. 2 is a chart illustrating a preferred command structure utilized by the weight indicating devices of the present invention.

In another aspect of the present invention, and with relation to FIGS. 2 and 7, master integrated load cell 27 relays data indicative of a weight to the monitoring system. As illustrated in FIG. 7, ports 40 facilitate a preferred daisy chain connection between modules and allow both data and power to be transmitted within the system to the individual modules. Additionally, master integrated slave 27 includes data ports 34 for receiving and transmitting data to and from the slave modules 16. Preferably, the master integrated load cell 27 includes five additional ports 34 for connection to the slave terminals 16. Moreover, communications bus 36 facilitates the transfer of the data to the central controller 22 and to the communications controller 20. As would be readily understood, different number of communications port with the master integrated load cell is within the scope of the present invention. Accordingly, master load cell 27 serves as a master weight indicating device 15 for the present invention.

Figure 8:
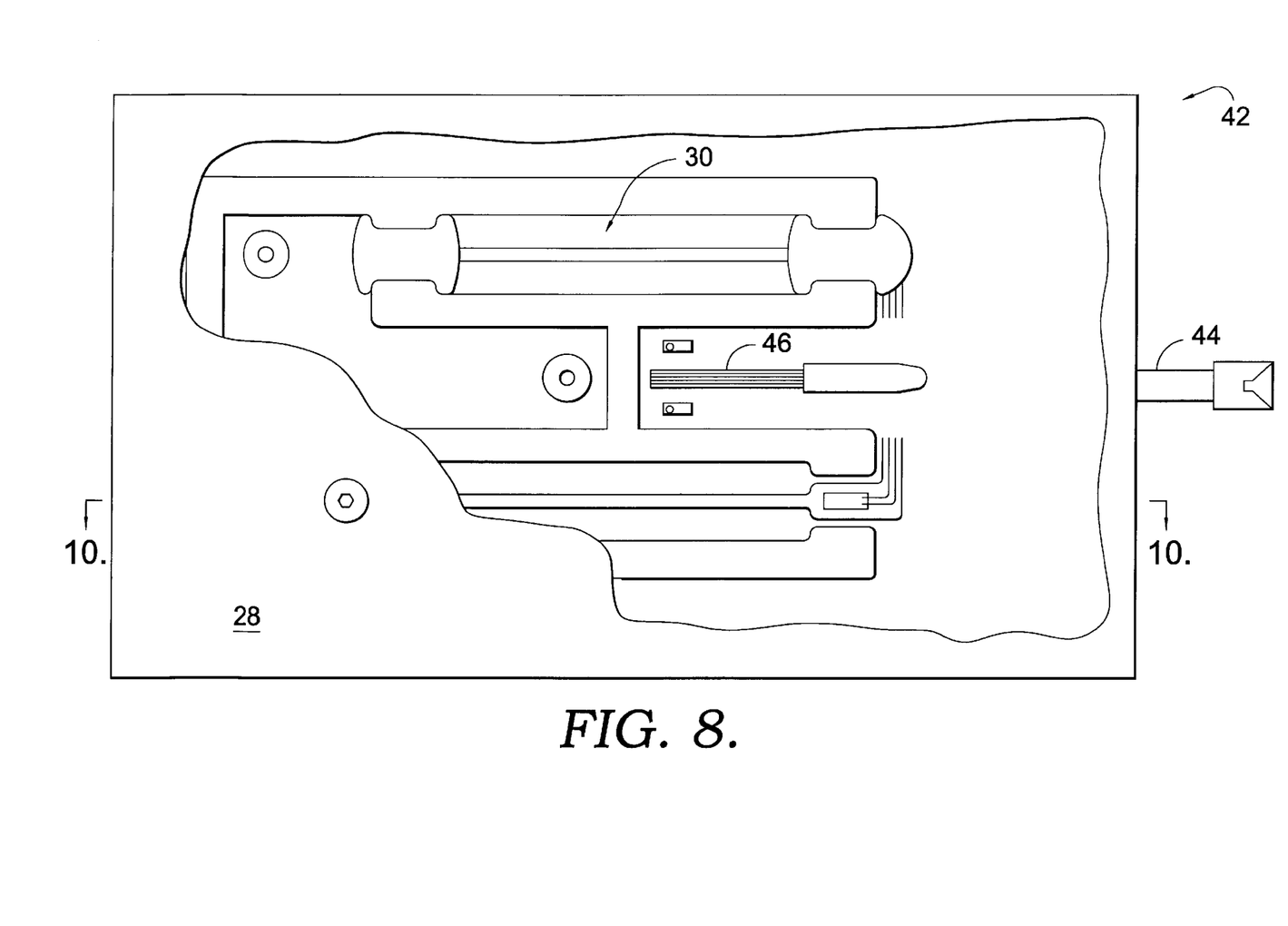
FIG. 8 is a top plan view of the slave integrated load cell of the present invention with cutouts demonstrating the preferred construction.
Figure 9:
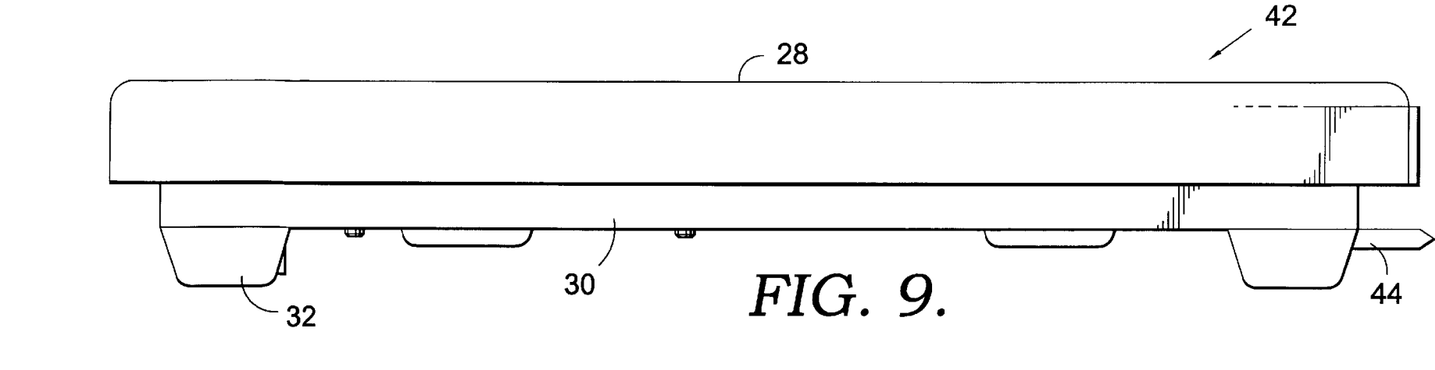
FIG. 9 is an elevational view of the slave integrated load cell of the present invention.
Figure 10:
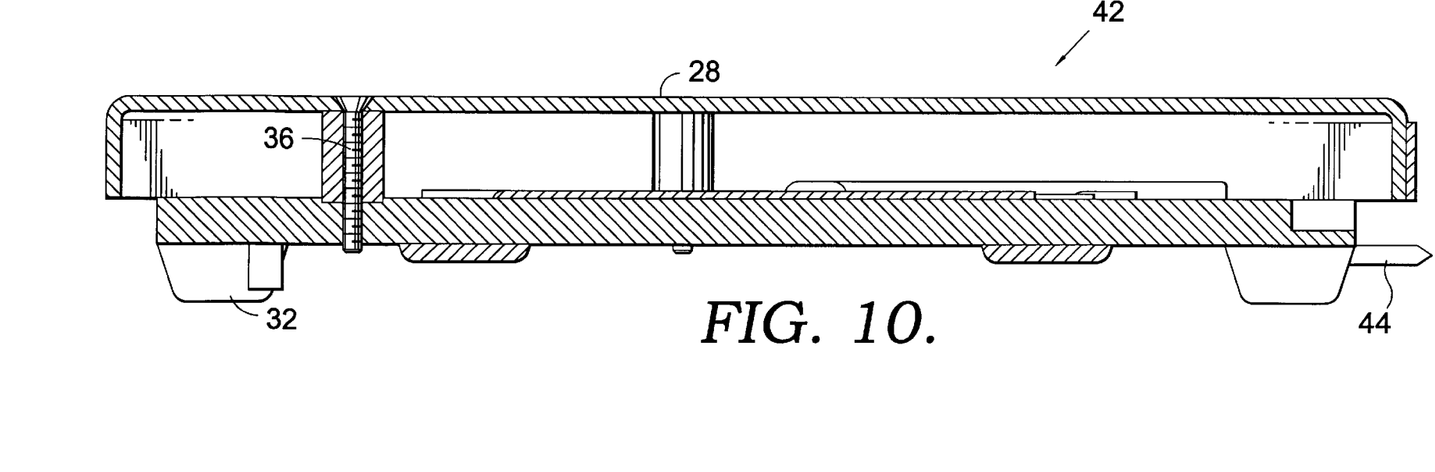
FIG. 10 is a sectional view of the slave integrated load cell of the present invention.

FIGS. 8, 9 and 10 are illustrative of a preferred slave integrated load cell 42 of the present invention. Similar to the master integrated load cell, the slave integrated load cell 42 includes a top platter 28, preferably constructed of metal and overlapping the walls of the slave integrated load cell 42. Slave 42 also includes a load cell 30 and four legs 32 for supporting the slave 42. Additionally, slave 42 includes a communication line 44 for coupling to the master weight indicating device.

With reference to FIGS. 8 and 10, as a bin (or other object) is placed on the top platter 28, the platter experiences a downward force. The downward force is then translated to multiple spacers 36, which are in contact with the load cell 30. Load cell 30 receives the downward force, and accordingly produces a corresponding voltage indicative of the force. No additional base support is required for the load cell 30, as conventionally done. The voltage produced by the load cell 30 is then transferred externally, via communications link 46, to the external line 44 to interface with a master weight indicating device. Similar to the master integrated load cell, the corresponding voltage is converted to a digital signal by the master integrated load cell A/D converter and transferred to the central controller. The central controller can then convert the digital signal into weight data for the monitoring system or alternatively transfer the digital signal to the central system controller via the communications controller.

The present invention is described in association with a master weight indicating device receiving data from additional slave indicating devices. As would be readily understood, the present invention could also be implemented with a separate module including the communication controller and a module controller, but not having the additional weight indicating components. Accordingly, in this alternative, any number of weight indicating devices, such as the slave weight indicating devices, would be coupled with the module.

Additionally, either of the weight indicating devices of the present could also include a display or other visual and/or audio indicator for alerting the customer site that one or more of the weight indicating devices may be inoperable or malfunctioning. Preferably, the indicating device is light emitting diode (LED) which would indicate an error to be reported. One example of a possible configuration of the LED indicator includes a green LED to indicate proper function and a red LED to indicate an error. Another configuration involves a blinking LED to indicate an error, with the LED either lit continuously or unlit during proper function. Yet another possible configuration of the LED indicator would include a lit LED (of any color) to indicate an error and an unlit LED to indicate proper function. As would be readily understood, additional indicators, including, but not limited to, horns, sirens, or other visual indicators, are within the scope of the present invention.

The present invention also provides a preferred communications protocol for establishing two-way communications between the individual weight indicating devices and the monitoring system. Preferably, each module within the system is referenced by an address indicative of the module. Additionally, each weight indicating device is referenced by a subaddress indicative of the individual weight indicating device within the particular module. The subaddress allows the central system controller 14 to communicate with a specific weight indicating device 16 and for the central system controller 14 to identify which particular weight indicating device 16 is responding when receiving communications. Thus, the central system controller can use the communication protocol of the present invention to broadcast a message intended for only a single weight indicating device over the communications line, and have only the appropriate weight indicating receive the communication.

Figure 3:
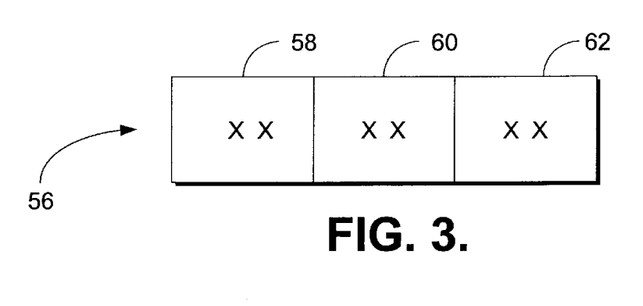
FIG. 3 illustrates a preferred command data structure for communicating between the central system controller and a weight indicating device of the present invention.

FIG. 2 is a table illustrating a preferred calculate weight command issued to a module having 6 weight indicating devices. The table includes a heading 50 indicating an address for the particular module, in this example "27". The table also includes a first column 52 indicating a device subaddress, 0–5, and a second column 54 indicating the resulting command. With reference to FIG. 3, for illustrative purpose, a preferred command data structure 56 would include a two digit place 58 for indicating the address of module, a second two digit place 60 for indicating a subaddress of the weight indicating device, and a third two digit place 62 for indicating the command relating to the communication.

With reference again to FIG. 2, if the command for telling the weight indicating device to transfer a weight reading is the numeral "05", then the corresponding command to tell the third weight indicating device to transfer the weight would be "27205" as illustrated at 64. As would be readily understood, modified or different data structures for identifying the module or weight indicating device is within the scope of the present invention.

Generally, and referring back to FIG. 1, central system controller 14 sends commands to the modules 12 and receives data from the modules and/or the separate weight indicating devices 16. Preferably, the central system controller is further connected to an enterprise controller 66 for controlling various functions associated with the central system controller of the system 10. The enterprise controller 66 preferably controls an inventory system 68, an order generating system 70, a customer order approval system 72, a billing system 74 and a reporting system 76. Each of these systems perform dedicated tasks associated with monitoring inventory levels. Additionally, power controller 78 is in communications with the modules 12 to provide power to the system. As would be readily understood, central system controller 14 may be a single or multiple systems. Additionally, power may be provided locally to each module 12.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

We claim:

1. An electronic weight indicating module, said module comprising:

two or more weight indicating devices with the first of said weight indicating devices being a master weight indicating device, said weight indicating devices providing an analog voltage signal corresponding to a weight;

a microprocessor housed within said master weight indicating device, said microprocessor in communication with said weight indicating devices, said microprocessor receiving data indicative of a weight from said weight indicating devices and communicating said data to an external source;

an analog to digital (A/D) converter, said A/D converter in communication with said weight indicating devices, said A/D converter receiving said analog signals and converting said analog signals to a digital weight signal, said A/D converter sending said digital weight signals to said microprocessor; and a communications controller, said communications controller operable to relay weight indicating data to said external source.

2. The electronic weight indicating module as recited in claim 1, wherein a second of the weight indicating devices is a slave weight indicating device, the slave weight indicating device in communication with and operably coupled to the master weight indicating device.

* * * * *